Oct. 26, 1965 D. W. McMURTRIE 3,213,724
LATHE DOG
Filed Oct. 30, 1962 3 Sheets-Sheet 1
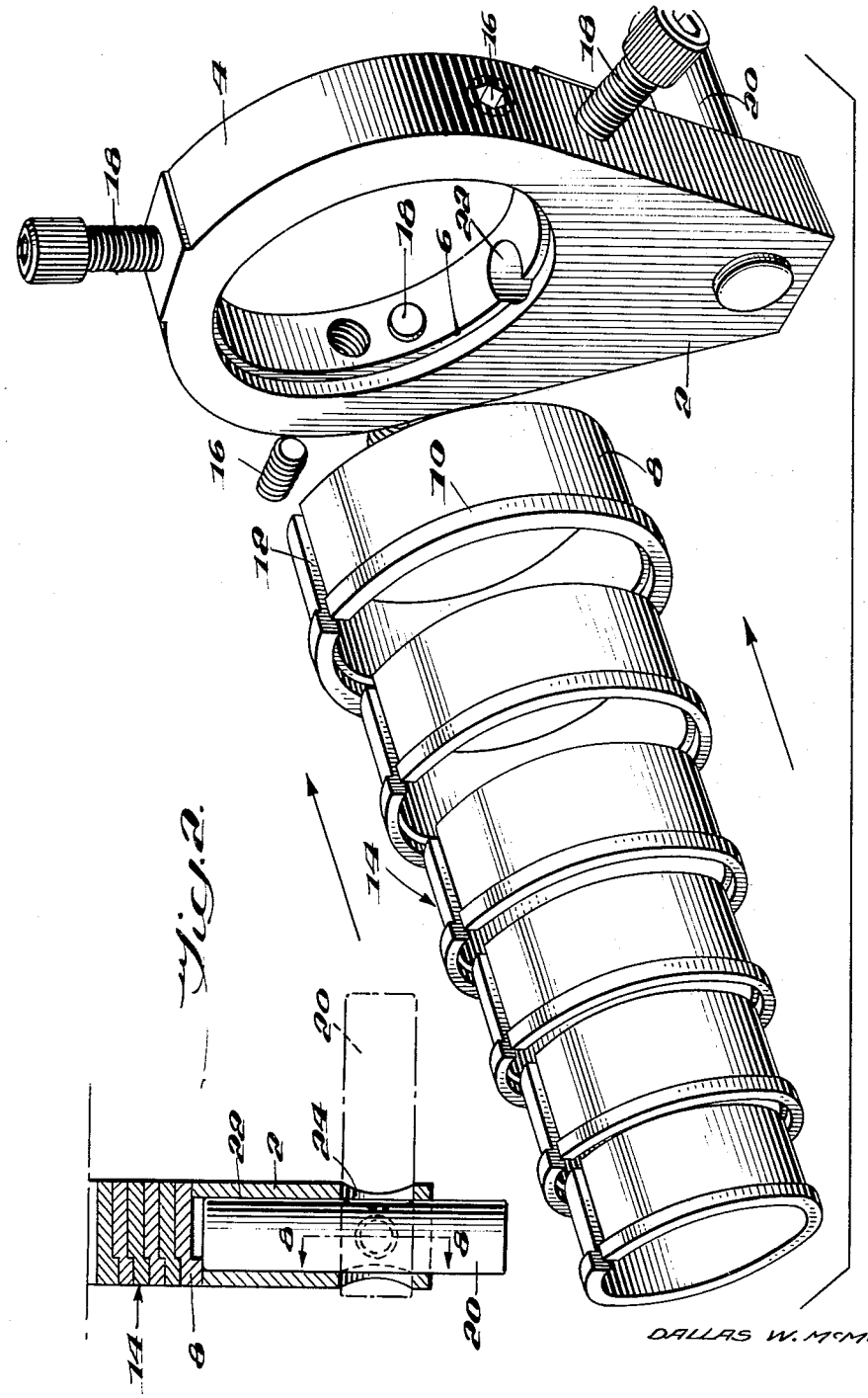
INVENTOR
DALLAS W. McMURTRIE,
ATTORNEYS

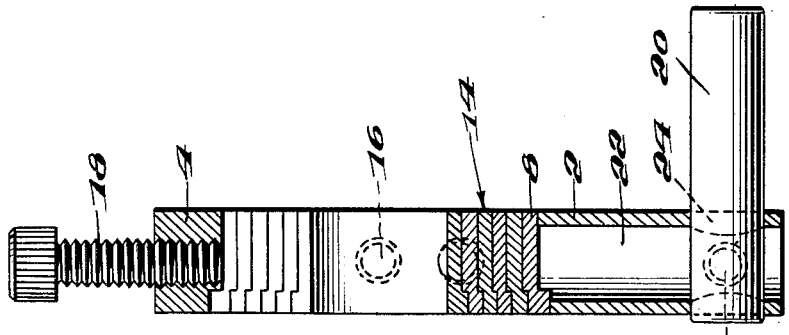
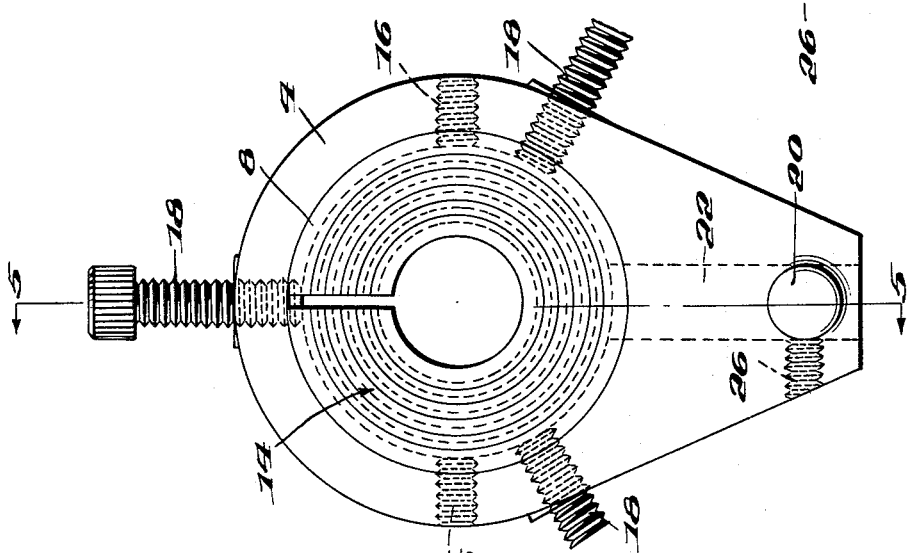
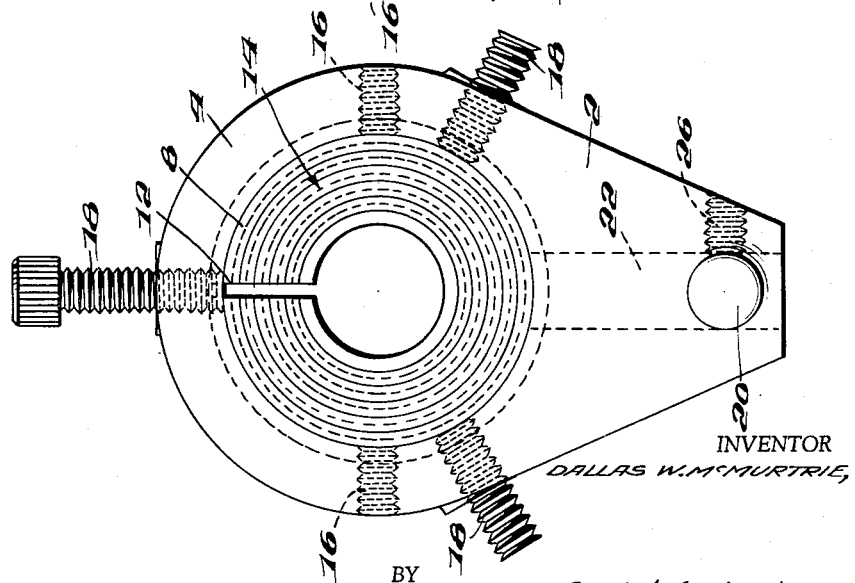

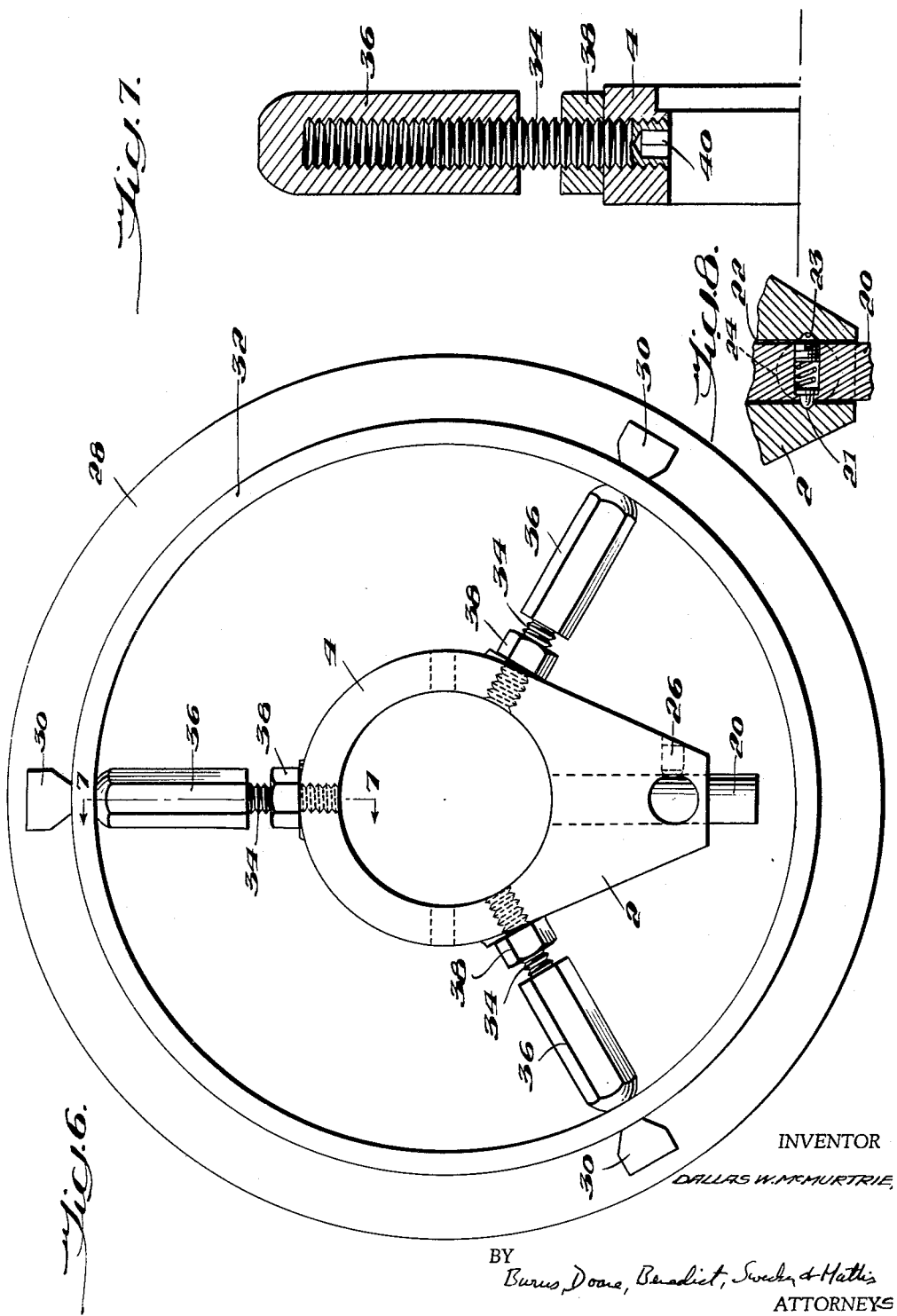

United States Patent Office 3,213,724
Patented Oct. 26, 1965

3,213,724
LATHE DOG
Dallas W. McMurtrie, Rte. 4, Veedersburg, Ind.
Filed Oct. 30, 1962, Ser. No. 234,095
10 Claims. (Cl. 82—41)

This invention relates to a lathe tool and more particularly, to a combination lathe dog and universal work holder for use with engine lathes.

A conventional lathe dog is in the form of an oval collar for receiving bar stock or cylindrical workpieces. One side of the interior of the collar is shaped in the form of a V. On the opposite side of the collar, a set screw extends through the collar to engage a workpiece and to clamp it against the interior V-shaped wall of the collar. A tail extends radially outward from the collar of the lathe dog and the end of the tail is bent at right angles to cooperate with the face plate, which is provided with a radial slot for engaging the bent tail of the lathe dog.

Conventional lathe dogs are usually cast in one piece and are provided in many different sizes to accommodate different sizes of workpieces. Machinists cannot conveniently store conventional lathe dogs in their tool boxes because they are bulky and the bent tail makes storage awkward. Also, many different sizes of lathe dogs would be required by a machinist and there is not sufficient space in his tool box for storing them.

A set screw cannot be used to clamp workpieces of a soft material in a conventional lathe dog because the set screw would cut into the surface of the workpiece and mar its surface. Even if marring of the surface of the workpiece is not objectionable, the set screw may not be capable of clamping the workpiece adequately to transmit the driving torque from the face plate to the soft metal surface of the workpiece.

Short cylinders may be turned and faced on an engine lathe by using a jaw chuck in which the cylinder is clamped between the jaws of a rotatable chuck on the lathe. If the cylinder, however, is a thin wall cylinder, the jaws may crush the cylinder as they close to clamp against the outer wall of the cylinder. Fixtures have been provided for mounting thin walled cylinders in chucks, but they are expensive and are not always available for use.

In view of the foregoing defects of conventional lathe dogs and chucks, it is an object of this invention to provide a universal lathe tool for accommodating a wide range of sizes of workpieces.

It is another object of this invention to provide a lathe tool which is compact and easily storable in a machinist's tool box.

It is a further object of this invention to provide a lathe dog which effectively clamps soft bar stock.

It is a still further object of this invention to provide a lathe tool which internally supports thin walled cylinders in jaw chucks.

These objects are accomplished in accordance with a preferred embodiment of the invention by a lathe tool having an elongated body portion with a circular collar in one end of the body. A projecting tail portion of the lathe tool is separable from the body portion and a cavity in the body portion is adapted to receive the tail for storage. Adjustable clamp screws are provided in the collar for different sizes of workpieces and bushings are provided for soft metal workpieces. External cap screws on the collar of the lathe tool are adjustable radially for cooperating with the jaws of a chuck to clamp a thin walled cylinder in the chuck.

This preferred embodiment of the invention is illustrated in the accompanying drawings in which:

FIG. 1 is an exploded perspective view of the lathe tool of this invention;

FIG. 2 is a detailed cross-sectional view as in FIG. 5, showing the tail pin in stored position;

FIG. 3 is a front elevational view of the lathe tool;

FIG. 4 is a rear elevational view of the lathe tool;

FIG. 5 is a cross-sectional view of the tool along the line 5—5 in FIG. 4;

FIG. 6 is an elevational view of a modified form of the lathe tool for clamping a thin walled cylinder in a conventional chuck;

FIG. 7 is an enlarged cross-sectional view of the lathe tool along the line 7—7 in FIG. 6; and FIG. 8 is a cross-sectional view of a modified form of the drive pin securing means, as in FIG. 2, along the line 8—8.

The universal lathe tool of this invention has a body portion 2, which may be formed out of metal plate or may be cast. One end of the body 2 is in the form of a ring or collar 4. A shoulder 6 extends around the interior circumference of the collar 4 and a bushing 8 is provided with a flange 10 to engage the shoulder 6 for positioning the bushing 8 within the collar 4. A longitudinal slot 12 in the collar 8 permits the bushing to be compressed to reduce the diameter of the bushing. Each of a set of bushings 14 of graduated diameters slides in telescoping relation within the next larger bushing for clamping various sizes of bar stock. Each of the bushings 14 has a shoulder corresponding to the shoulder 6 and is substantially identical with the bushing 8, except that the bushings 14 are smaller in diameter. A pair of diametrically opposed set screws 16 on opposite sides of the collar 4 compress the bushings 8 and 14 to clamp a workpiece in the bushings and to retain the bushings in the collar 4. One of the bushings 14 which has an internal diameter slightly larger than the outside diameter of the workpiece is selected and the bushings 14 are telescoped sequentially in the larger bushings and in the bushing 8 and inserted in the collar 4. Thus, the workpiece may be clamped only in the bushing 8, if it is a large workpiece, or in one of the bushings 14, which is telescoped in the larger bushings 8 and 14, if it is a small workpiece.

If a workpiece has an irregular circumference, or if it is formed of a hard material, so that the surface will not be marred by set screws, the workpiece may be clamped in conventional clamp screws 18. It may be necessary to provide internally threaded steel inserts in the collar 4 to receive the clamp screws 18. When the clamp screws 18 are used for securing the workpiece in the lathe dog, the bushings 8 and 14 are removed from the collar 4. The two clamp screws 18 which are located adjacent to the set screws 16 may be substituted for the set screws, or the screws 18 may be used to accomplish the same function as the set screws 16 in compressing the bushings 8 and 14, but since they are not located directly oppositely of each other, they are not as effective as the set screws 16.

The tail 20 of the lathe tool is in the form of a pin which is separable from the body 2. A longitudinal bore 22 extends from the end of the body 2 to the interior of the collar 4. A transverse bore 24 extends through the body substantially parallel to the central axis of the collar 4 and intersects the longitudinal bore 22. A set screw 26 extends through the body at the intersection of the longitudinal and transverse bores to clamp the tail pin 20 in stored position in the longitudinal bore 22, as shown in FIG. 2, or in driving position in the transverse bore 24.

The lathe tool is stored in the machinist's tool box with the tail pin 20 clamped in the longitudinal bore 22 by the set screw 26. It is removed from the tool box and the pin 20 is removed from the longitudinal bore, inserted in the transverse bore 24 and clamped by the set screw 26, so that it is in driving position, as shown in FIG. 5. If the workpiece is of a soft metal, it may be clamped in the bushings 8 and 14. One of the bushings 14 having an internal diameter slightly larger than the diameter of the workpiece is selected. The selected bushing and each of the larger bushings are telescoped together and inserted in the collar 4, as shown in FIGS. 3 to 5. The workpiece is then inserted in the assembled bushings 8 and 14 and the set screws 16 are tightened against the bushing 8 to compress all of the bushings 8 and 14 and to reduce the internal diameter of the smallest bushing, and thereby clamp the workpiece in the lathe dog.

If the workpiece has a hard surface or has an irregular shape, the lathe dog is removed from the tool box and the tail pin 20 is removed from the storage position and clamped in driving position in the transverse bore 24. The workpiece is then secured between the clamp screws 18 and the lathe dog may be used in a conventional manner.

A modified form of the invention is illustrated in FIGS. 6 and 7. A conventional lathe chuck 28 is illustrated schematically in FIG. 6. The jaws 30 of the chuck move radially to clamp a workpiece 32 in the chuck. If the workpiece is a thin walled cylinder, as shown in FIG. 6, the compressive forces of the jaws 30 tend to collapse the workpiece. In the modified form of the lathe tool, the clamp screws 18 are replaced by continuously threaded studs 34. Internally threaded caps 36 are screwed on the projecting ends of the studs 34 and jam nuts 38 on the studs 34 may be jammed against the base of the caps 36 or the collar 4. As shown in FIG. 7, the studs 34 are provided with Allen wrench sockets 40 for turning the studs 34 relative to the caps 36, the jam nuts 38, or the collar 4.

To provide internal support for the cylindrical workpiece 32, the drive pin 20 is stored in the longitudinal bore 22, so that it does not interfere with a cutting tool. The studs 34 are rotated to clamp the caps 36 against the interior wall of the workpiece 32. The jam nuts 38 prevent the studs 34 from turning after the workpiece is clamped. The distance between the caps 36 and the collar 4 can be adjusted by rotating the caps 36 relative to the screws 34, by rotating the screws relative to the caps, or by rotaing the caps and the screws relative to the collar 4. To facilitate these several methods of adjustment, the nuts 38 may be jammed against the collar 4 to lock the screws 34 to the collar 4, or they may be jammed against the base of the caps 36 to lock the caps to the screws.

The particular advantage of having several methods of adjusting the position of the caps 36 relative to the collar 4 is that the workpiece may have a flange which makes it impossible to reach the caps 36 for adjustment. In this situation, the nuts 38 may be jammed against the caps 36 and the position of the caps adjusted by means of a wrench inserted in the socket 40.

A thin walled cylinder, such as illustrated in FIG. 6 may also be suspended between centers in a lathe by using two of the lathe tools of this invention in each end of the cylinder and by clamping a mandrel in the collars 4. The mandrel may be clamped by means of the screws 34. One of the lathe tools drives the workpiece and accordingly the tail pin 20 is in driving position, as shown in FIG. 5, to engage the face plate of the lathe. The other lathe tool has its tail pin in stored position, so as not to interfere with cutting tools or the dead center. By this arrangement, the lathe tools provide a fixture for turning and facing cylinders.

A modified form of the drive pin securing means is shown in FIG. 8. Instead of the set screw 26, the pin 20 is secured within the longitudinal bore 22 by a spring loaded ball 21 which engages a circular groove 23 in the bore 22. The depth of the groove 23 and the force of the spring are sufficient to maintain the pin 20 in the body portion 2 during rotation of the tool, but yet permit manual removal of the pin 20 from the bore 22.

Although lathe dogs have been in use for many years, they are bulky and cannot be conveniently stored in a machinist's tool box. Conventional lathe dogs are not suitable for clamping workpieces of unusual characteristics, such as workpieces of soft material, large cylinders, or thin walled cylinders. Furthermore, many different sires of conventional lathe dogs must be stocked for use with different sizes of workpieces. The lathe tool of this invention provides in a single tool a compact lathe dog which may be stored in a machinist's tool box, a lathe dog capable of accommodating a variety of sizes of workpieces and workpieces of soft metal, and a lathe tool which supports in a lathe, large or thin walled cylinders.

While this invention has been illustrated and described in one embodiment, it is recognized that changes may be made therein without departing from the invention as set forth in the claims.

I claim:

1. A lathe dog comprising a body, said body having a circular opening therethrough, means for clamping a workpiece in the opening, said body having a transverse bore substantially parallel to the central axis of the opening and a longitudinal bore extending radially of the opening and intersecting said transverse bore, a tail pin and means in the body for selectively securing the tail pin in one of the bores.

2. A lathe dog comprising a body, said body having an opening therethrough, means for clamping a workpiece in the opening, a tail pin, said body having a transverse bore extending substantially parallel to the central axis of the opening and a longitudinal bore extending radially of the opening and intersecting said transverse bore, and a set screw at the intersection of said bores for securing the pin selectively in one of the bores.

3. A lathe work carrier comprising a body, said body having an opening therethrough, at least three threaded studs extending through the body and into the opening, a cap threaded on each stud, and said studs having a wrench socket therein for rotating the stud.

4. A lathe work carrier comprising a body, said body having a circular opening therethrough, at least three threaded studs extending through the body and into the opening, a cap on each stud, said cap having internal threads cooperating with the threads on the stud, and a lock nut on each stud for cooperating with the cap and the body selectively.

5. A lathe work carrier comprising a body, said body having an opening therethrough, at least three threaded studs extending through the body and into the opening, a cap on each stud, said cap having internal threads cooperating with the threads on the stud, a nut on each stud between the cap and the body to jam against the cap and the body selectively, a tail pin extending outwardly from the body, said body having a transverse bore extending substantially parallel to the central axis of the opening and a longitudinal bore extending radially from the opening and intersecting the transverse bore, and means for clamping the tail pin selectively in the transverse and longitudinal bores.

6. A lathe dog comprising a body, said body having an opening therethrough, means for clamping a workpiece in the opening, a tail pin, said body having a transverse bore extending substantially parallel to the central axis of the opening and a longitudinal bore extending radially of the opening and intersecting said transverse bore, said longitudinal bore having a circular groove therein, and a spring biased ball in the tail pin in position to engage the groove when the tail pin is inserted in the longitudinal bore.

7. A lathe dog comprising a body having opposite faces and an edge extending around the body between the faces, means for securing the body to a workpiece, a tail pin, said body having a first cavity in said body extending from one face thereof, and a second cavity in said body extending from said edge, said cavities being in intersecting relation, and means for selectively securing the pin in either of said cavities.

8. A lathe dog comprising a body having opposite faces and an edge extending around the body between the faces, means for securing the body to a workpiece, a tail pin, said body having a first cavity in said body extending from one face thereof substantially perpendicularly thereto, and a second cavity in said body extending from said edge substantially parallel to said faces, said cavities being in intersecting relation, and means for selectively securing the pin in either of said cavities.

9. A lathe work carrier comprising a body, said body having an opening therethrough, at least three threaded studs extending through the body and into the opening, a cap having internal threads on each stud, said studs having a wrench socket in one end, a threaded nut on each stud between the cap and the body to jam against the cap and the body selectively, a tail pin, said body having a transverse bore extending substantially parallel to the central axis of the opening and a longitudinal bore extending radially from the opening and intersecting the transverse bore, and means for securing the tail pin selectively in the transverse and longitudinal bores.

10. A lathe dog comprising a body, said body having an opening therethrough, a plurality of bushings in telescoping relation to said opening, each of said bushings having a radial slot extending therethrough for adjusting the diameter of the bushings, a screw extending through said body and engaging said bushings, a tail pin extending outwardly from the body, said body having a transverse bore extending substantially parallel to the central axis of the opening and a longitudinal bore extending radially from the opening and intersecting the transverse bore, and means for temporarily securing the tail pin selectively in the transverse and longitudinal bores.

References Cited by the Examiner
UNITED STATES PATENTS

| | | | |
|---|---|---|---|
| 189,953 | 4/77 | Niebell | 82—41 |
| 978,055 | 12/10 | Owens | 82—40 X |
| 2,407,908 | 9/46 | Ventres | 82—41 |
| 2,576,350 | 11/51 | Mazzola | 279—6 |
| 2,596,594 | 5/52 | Petre | 279—79 |
| 2,809,044 | 10/57 | Landreth | 82—45 X |
| 3,062,076 | 11/62 | Craig | 77—62 |

ANDREW R. JUHASZ, *Primary Examiner.*
WILLIAM W. DYER, Jr., *Examiner.*